United States Patent [19]

Nagasawa et al.

[11] Patent Number: 5,942,989
[45] Date of Patent: Aug. 24, 1999

[54] AUTOMATIC PATH SETTING APPARATUS FOR A SYNCHRONOUS COMMUNICATION SYSTEM

[75] Inventors: Hidemasa Nagasawa; Koichi Nishimura, both of Kawasaki, Japan

[73] Assignee: Fujitsu Limited, Kanagawa, Japan

[21] Appl. No.: 08/655,390

[22] Filed: May 30, 1996

[30] Foreign Application Priority Data

Nov. 7, 1995 [JP] Japan .................................. 7-288617

[51] Int. Cl.⁶ ........................ H04L 11/00; H04L 12/00
[52] U.S. Cl. ................ 340/826; 340/825.79; 340/825.8; 340/825; 370/222; 370/255; 370/411; 370/455; 375/356
[58] Field of Search ..................... 340/826, 827, 340/825.79, 825.8; 370/222, 223, 255, 411, 455; 375/356

[56] References Cited

U.S. PATENT DOCUMENTS

| | | | |
|---|---|---|---|
| 4,811,365 | 3/1989 | Manno | 375/107 |
| 5,485,455 | 1/1996 | Dobbins et al. | 370/60 |
| 5,533,006 | 7/1996 | Uchida | 370/16.1 |

Primary Examiner—William A. Cuchlinski, Jr.
Assistant Examiner—Yonel Beaulieu
Attorney, Agent, or Firm—Helfgott & Karas, P.C.

[57] ABSTRACT

An automatic path setting apparatus for a synchronous communication system equipped with a network management system (NMS) is provided which relieves the operator of the labor associated with routing and which permits prompt and reliable line settings. A line connection information storing element in the NMS stores information about line connection states of individual NEs. A specified information receiving element receives specified information about new path setting, and a path searching element searches for a path conforming to the specified information received by the specified information receiving element by referring to the information stored in the line connection information storing element.

29 Claims, 14 Drawing Sheets

| PRIORITY | SELECTION CONDITION | PATH TYPE | QUANTITY | CONNECTION METHOD |
|---|---|---|---|---|
| 1 | MSP-REQUIRED | VC12 | 1 | 1-WAY |
| 2 | RELAYS-MINIMUM | | | |
| 3 | DISTANCE-SHORTEST | | | |

FIG. 5

| No. | PATH | M S P | RELAY(S) | TRANSMISSION DISTANCE |
|---|---|---|---|---|
| 1 | A-B-C | A-B: AVAILABLE, B-C: AVAILABLE | 1 | 10km |
| 2 | A-E-C | A-E: NOT AVAILABLE, E-C: AVAILABLE | 1 | 8km |
| 3 | A-D-F-C | A-D: AVAILABLE, D-F: AVAILABLE, F-C: AVAILABLE | 2 | 12km |

FIG. 12

| Node | From | To |
|---|---|---|
| A | 4-E-1-1-2-3 | 1-1-1-3 |
| B | 1-1-1-3 | 2-1-1-3 |
| C | 1-1-1-3 | 4-E-1-1-2-1 |

FIG. 13

AUTOMATIC PATH SETTING APPARATUS FOR A SYNCHRONOUS COMMUNICATION SYSTEM

BACKGROUND OF THE INVENTION (1) Field of the Invention

The present invention relates to an automatic path setting apparatus for a synchronous communication system equipped with a network management system, and more particularly, to an automatic path setting apparatus for a synchronous communication system wherein the line configuration settings are performed automatically without the need for the routing by the operator.

(2) Description of the Related Art

In recent years there has been a demand for expansion of broadband ISDNs based on a globally standardized user network interface, and to meet the demand, SDH (Synchronous Digital Hierarchy) has been standardized which is capable of effectively multiplexing various high-speed services as well as existing low-speed services. SDH was standardized by Bellcore/ITU and is called SONET (Synchronous Optical Network) in the United States.

In a conventional transmission network based on PDH (Presiochroncous Digital Hierarchy), where the line configuration need be modified, the wiring of jumpers is physically changed. This method, however, requires much labor and time and lacks flexibility. In SONET/SDH, on the other hand, since each station has a built-in cross-connection function, the setting of the line configuration is performed at each station by means of software setting, and it is unnecessary to change the wiring of jumpers.

Meanwhile, multiplexed frames STM-4, STM-16, etc. used in SONET/SDH have entailed an increase in the line capacity, also increasing the frequency of modifications of the line configuration. Where the line configuration need be modified, if operators are required to visit individual network elements (hereinafter referred to as "NE(s)") which are installed in different places, the efficiency of the setting/modifying operation is low. In view of this, various methods have been put to practical use which include a remote access method wherein the line setting of an NE is modified by means of an overhead control signal transmitted from a remote maintenance terminal, and a method wherein the path setting of an NE is executed by a network management system (hereinafter referred to as "NMS") which performs centralized management of the entire network. The path setting by an NMS will be explained below.

When setting a path by means of an NMS, the operator first specifies NEs which correspond to the start point and end point of the path, respectively, as well as channel numbers of the NEs. The operator also specifies a route and its channel number. In accordance with the specified data, the NMS sets and establishes the path.

In the path setting by means of the conventional NMS, however, it is necessary for the operator to actually check drawings at desk, for example, in order to ascertain the present line configurations, remaining capacities, etc. and determine the route. Also, the operator can only check from the viewpoint of routing to see if the specified two points are connectable through the specified route, and whether or not the connection can really be achieved through the specified channel number remains unknown until the cross-connection setting is actually made with respect to the NEs.

SUMMARY OF THE INVENTION

An object of the present invention is to provide an automatic path setting apparatus for a synchronous communication system which relieves the operator of the labor associated with routing and which also permits reliable and prompt line setting.

To achieve the above object, there is provided an automatic path setting apparatus for a synchronous communication system equipped with a network management system. The automatic path setting apparatus comprises: a plurality of network elements interconnected to form a synchronous network; a network management system having communication means for communication with each of the network elements; line connection information storing means, provided in the network management system, for storing information about line connection states of the network elements; specified information receiving means, provided in the network management system, for receiving specified information about new path setting; and path searching means, provided in the network management system, for searching for a path conforming to the specified information received by the specified information receiving means by referring to the information stored in the line connection information storing means.

To achieve the above object, there is also provided an automatic path setting apparatus for a synchronous communication system equipped with a network management system, which comprises: a plurality of network elements interconnected to form a synchronous network; a network management system having Communication means for communication with each of the network elements; line connection information collecting means, provided in the network management system, for collecting information about line connection states retained by the network elements; specified information receiving means, provided in the network management system, for receiving specified information about new path setting; and path searching means, provided in the network management system, for searching for ;a path conforming to the specified information received by the specified information receiving means by referring to the information collected by the line connection information collecting means.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 4 is a chart showing links recorded in a link inventory;

FIG. 5 is a chart showing specified path selection conditions;

FIG. 12 is a chart showing the results of inquiries as to whether individual paths fulfill the path selection conditions;

FIG. 13 is a chart showing port numbers of individual nodes belonging to a path A-B-C.

DESCRIPTION OF THE PREFERRED EMBODIMENTS

An embodiment according to the present invention will be hereinafter described with reference to the drawings.

Figure 1:
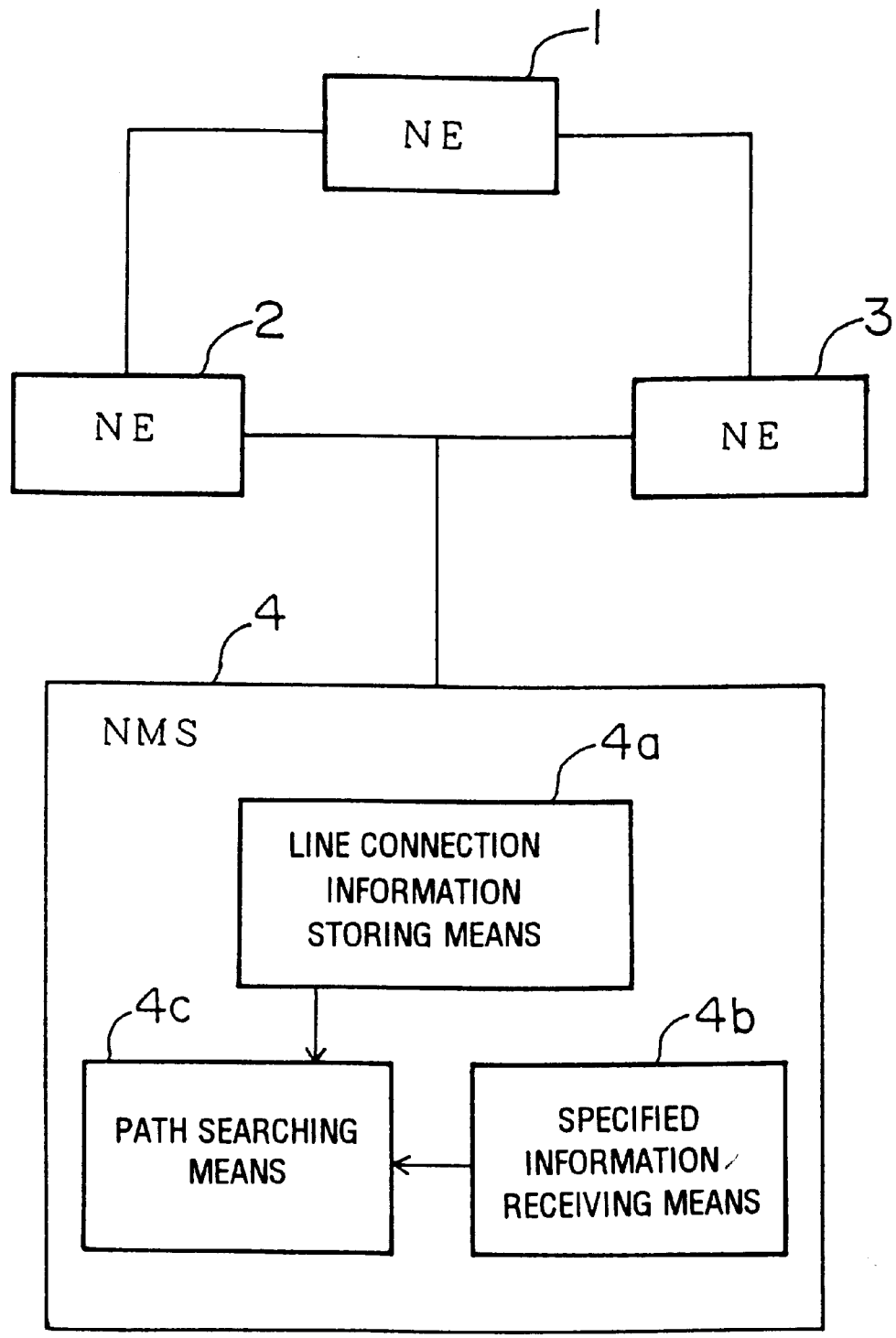
FIG. 1 is a diagram illustrating the principle of the present invention.

Referring first to FIG. 1, a theoretical configuration of the embodiment according to the invention will be explained. The embodiment of the present invention generally comprises a plurality of NEs (Network Elements) 1 to 3 interconnected to form a synchronous network, an NMS (Network Management System) 4 having communication means for communication with each of the NEs 1 to 3, line connection information storing means 4a provided in the NMS 4 for storing information about line connection states of the individual NEs 1 to 3, specified information receiving means 4b provided in the NMS 4 for receiving specified information about new path setting, and path searching means 4c provided in the NMS 4 for searching for a path conforming to the specified information received by the specified information receiving means 4b by referring to the information stored in the line connection information storing means 4a.

A specific configuration of the embodiment according to the present invention will be now described. The correspondence between the specific configuration described below and the theoretical configuration shown in FIG. 1 will be explained later following the description of the specific configuration.

Figure 2:
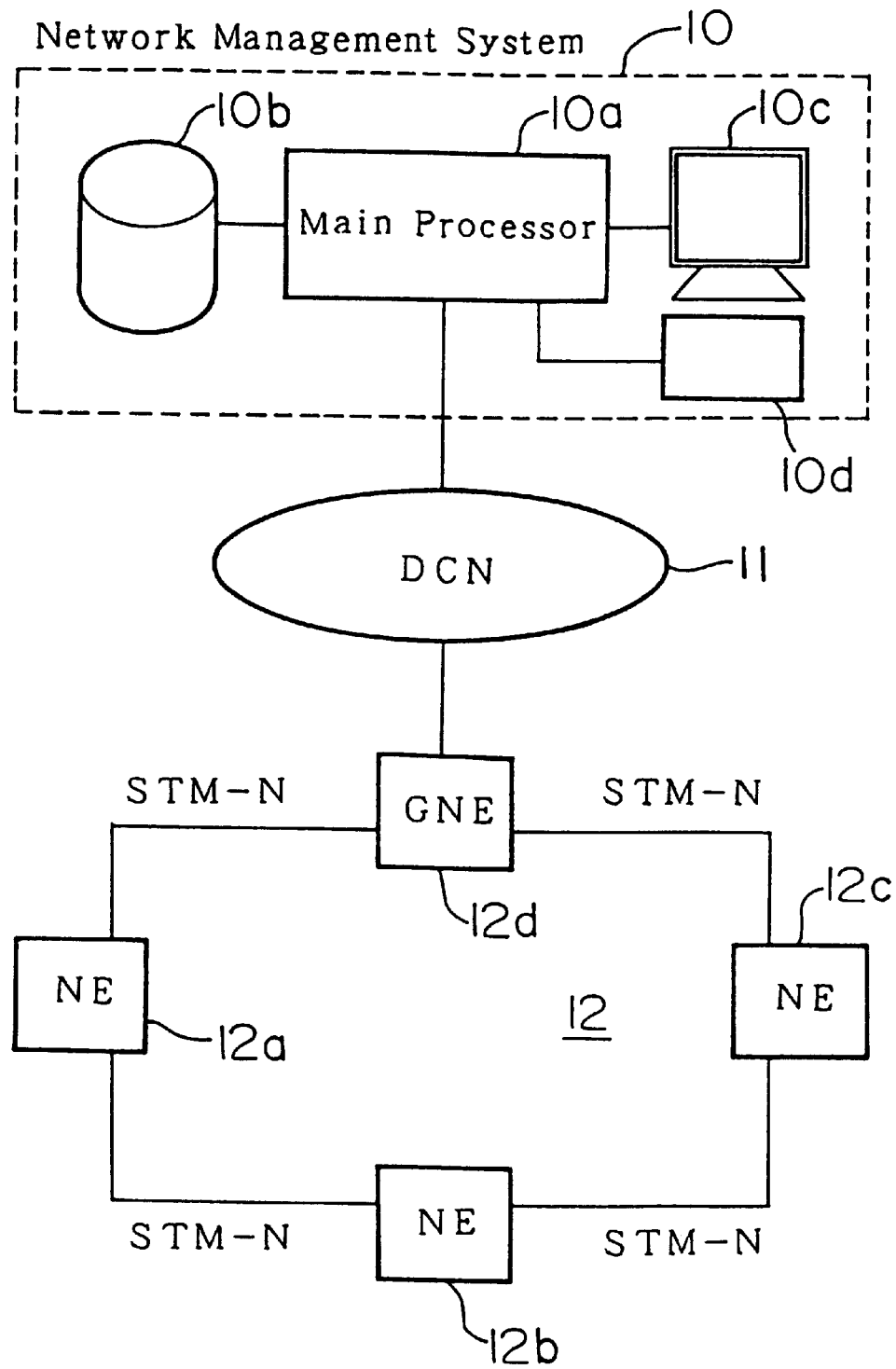
FIG. 2 is a diagram showing the configuration of an SDH network and an NMS.

FIG. 2 is a diagram showing the configuration of an SDH network and an NMS. An NMS 10 is connected to an SDH network 12 via a DCN (Data Communication Network) 11. The DCN 11 is a communication means such as X.25, LAN. The SDH network 12 comprises NEs 12a to 12c, a gateway NE 12d, and networking lines connecting these NEs. The networking lines transmit a multiplexed frame STM (Synchronous Transfer Mode Level)-N signal. The NMS 10 comprises a main processor 1a, a memory 1ob, a display device 10c and an input device 10d, and has the function of collecting information retained by the NEs 12a to 12c, the function of storing the collected information in the memory 10b to be used as a database, the function of carrying out various settings and control with respect to the NEs 12a to 12c, and the function of searching for paths that can connect predetermined two NEs, selecting the optimum path, carrying out cross-connection settings with respect to each NE, and stablishing the path.

The NEs 1 to 3 in FIG. 1 correspond to the NEs 12a to 12c in FIG. 2, the NMS 4 in FIG. 1 corresponds to the NMS 10 in FIG. 2, the line connection information storing means 4a in FIG. 1 corresponds to the memory 10b in FIG. 2, the specified information receiving means 4b in FIG. 1 corresponds to the main processor 10a, input device 10d and display device 10c in FIG. 2, and the path searching means 4c in FIG. 1 corresponds to the main processor 10a in FIG. 2.

The operation of the NMS 10 will be now described. In the following description, NE is called "node" and it is assumed that six nodes A, B, C, D, E and F are provided.

Figure 3:
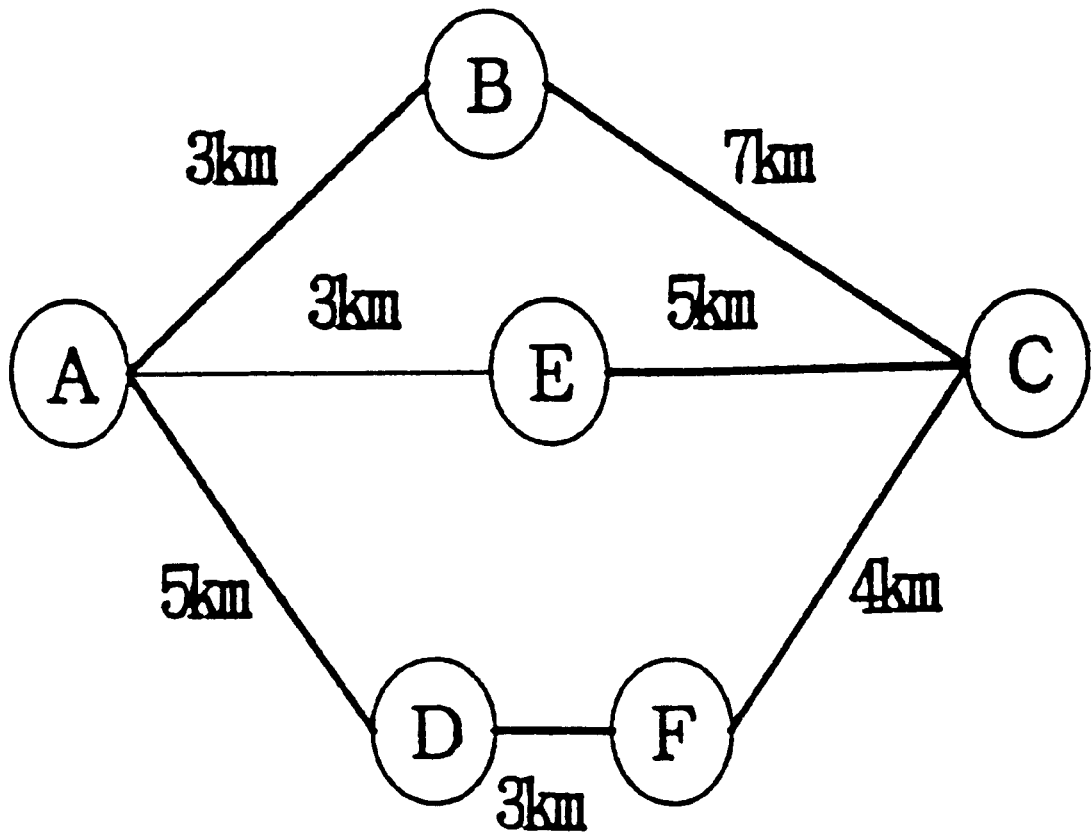
FIG. 3 is a diagram showing the arrangement of nodes A, B, C, D, E and F.
Figure 6:
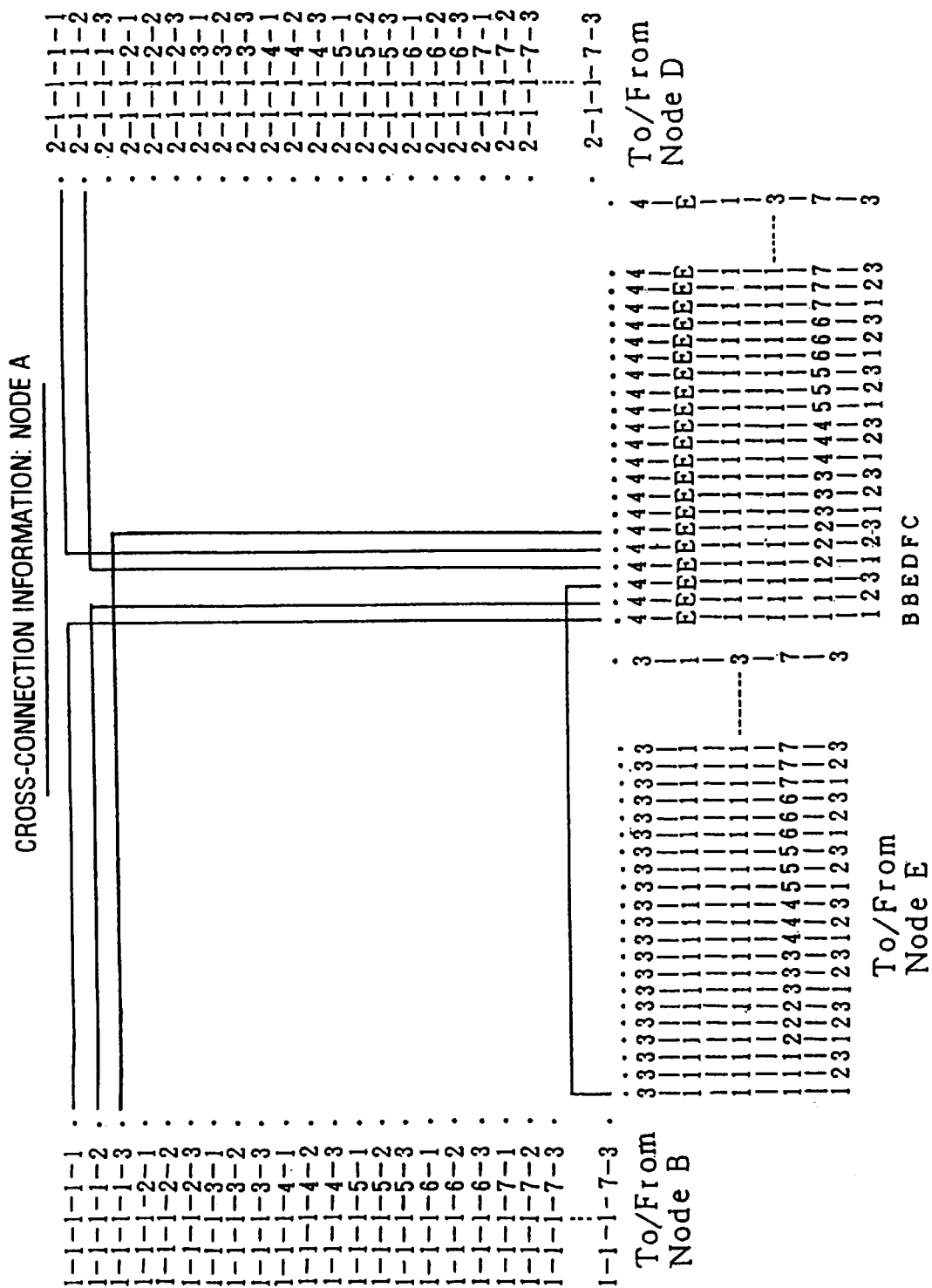
FIG. 6 is a chart showing cross-connection information of the node A.
Figure 7:
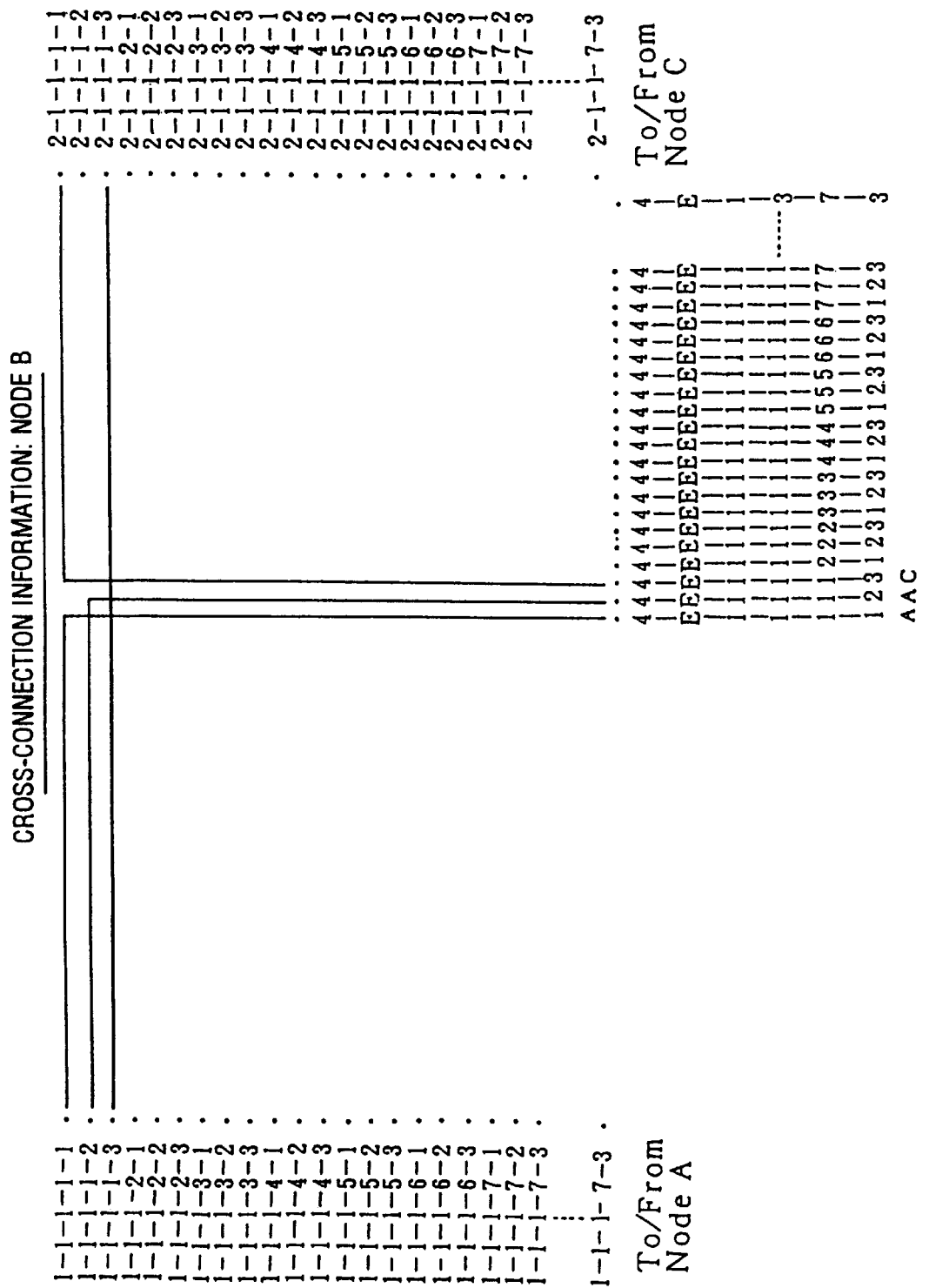
FIG. 7 is a chart showing cross-connection information of the node B.
Figure 8:
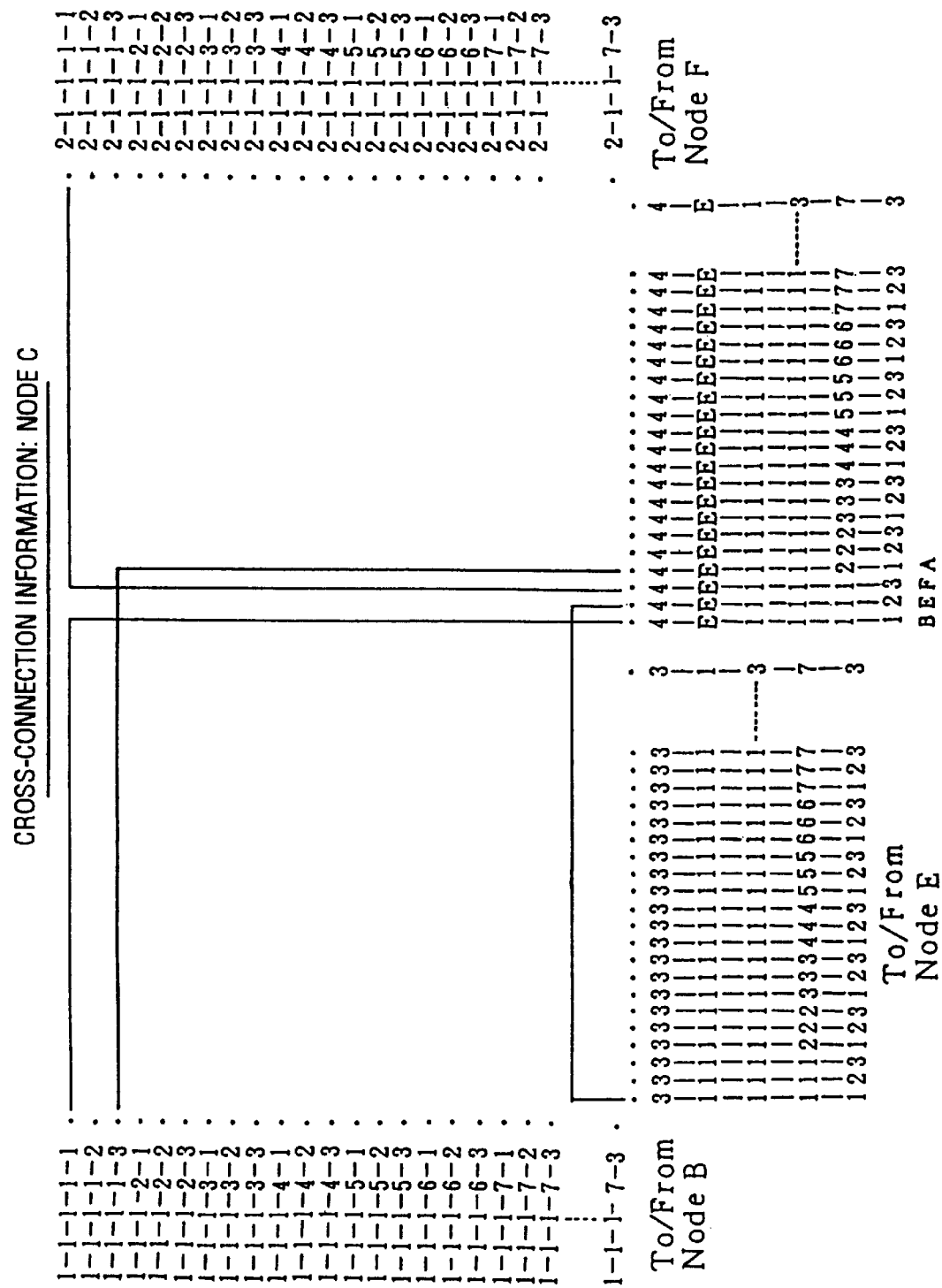
FIG. 8 is a chart showing cross-connection information of the node C.
Figure 9:
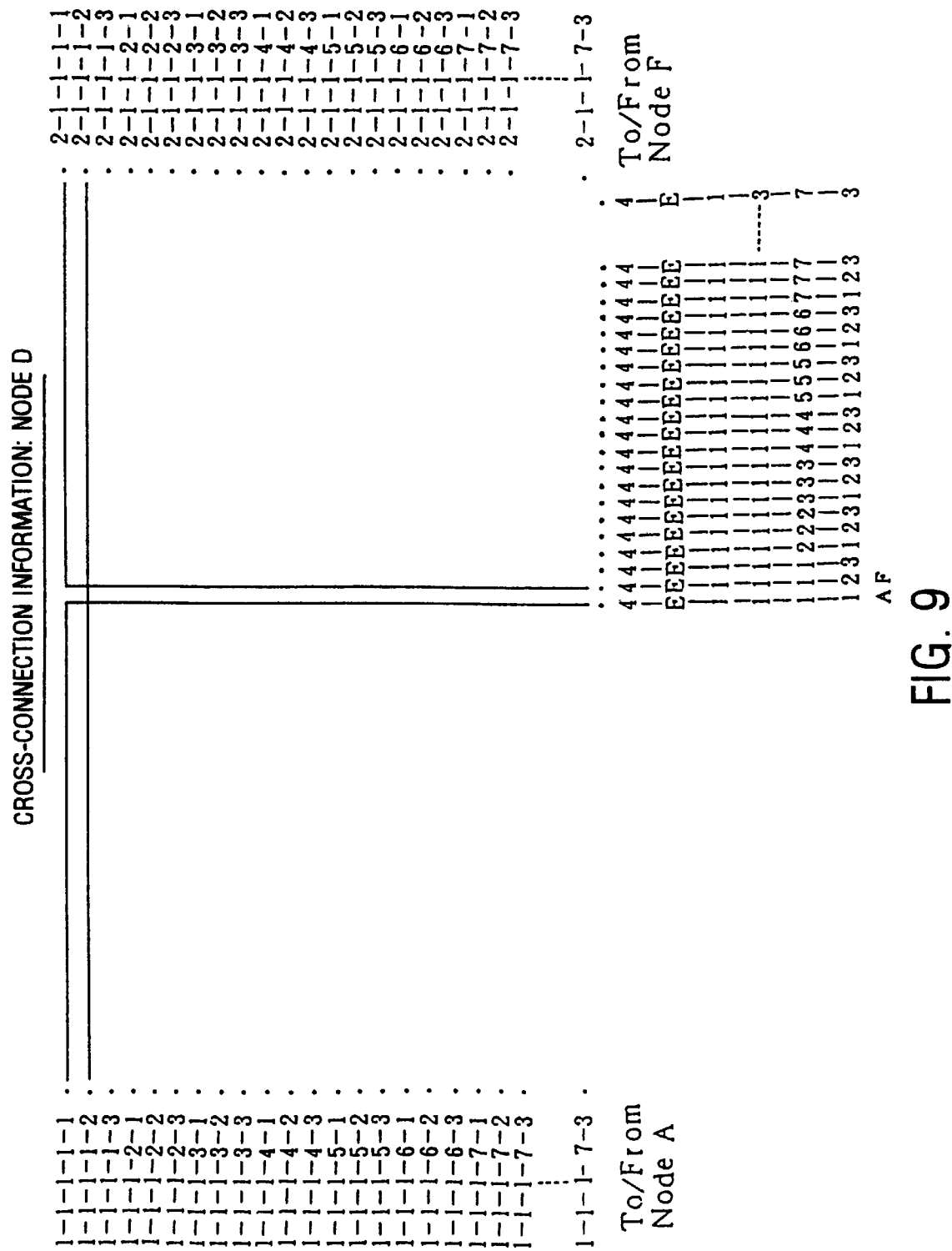
FIG. 9 is a chart showing cross-connection information of the node D.
Figure 10:
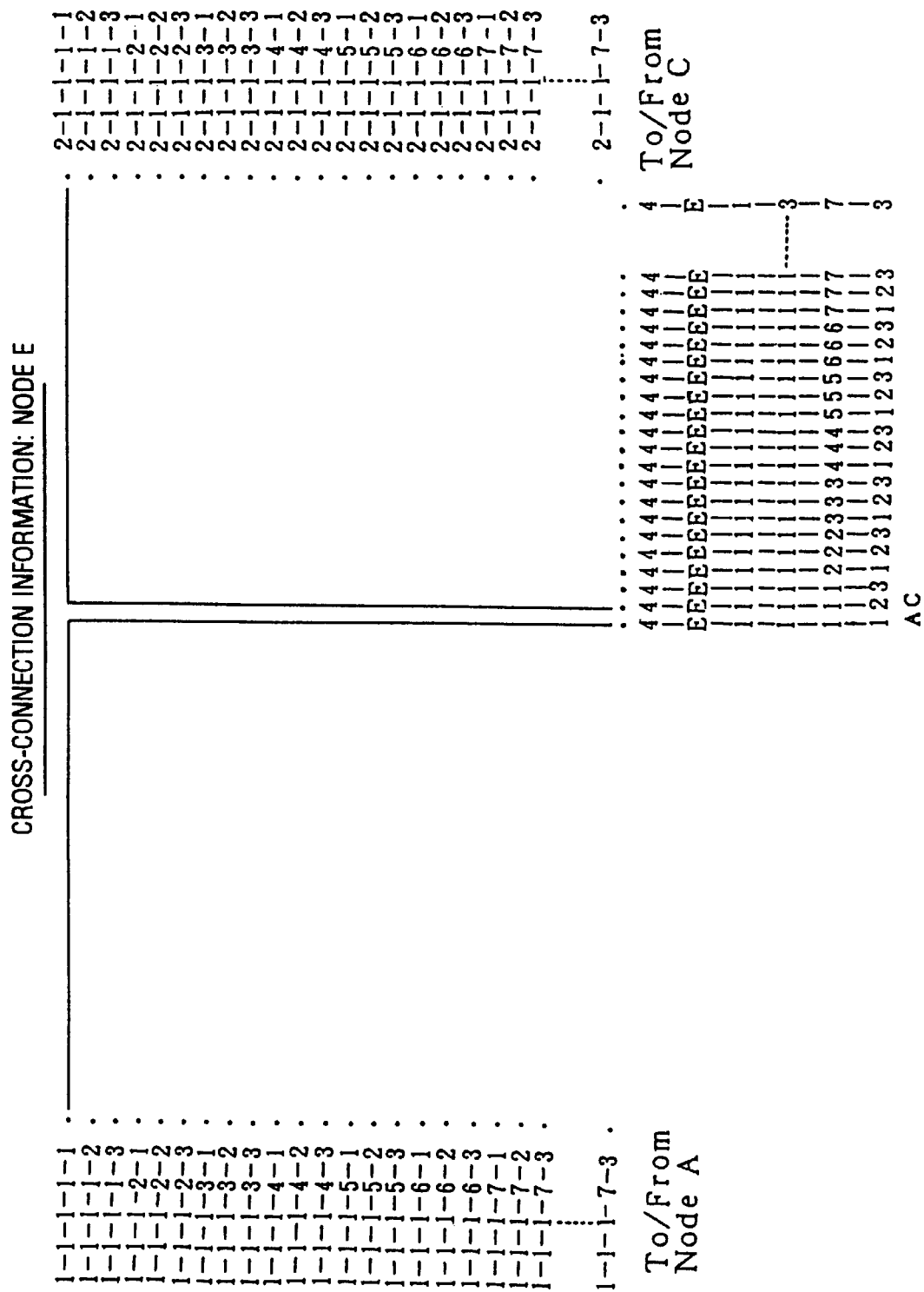
FIG. 10 is a chart showing cross-connection information of the node E.
Figure 11:
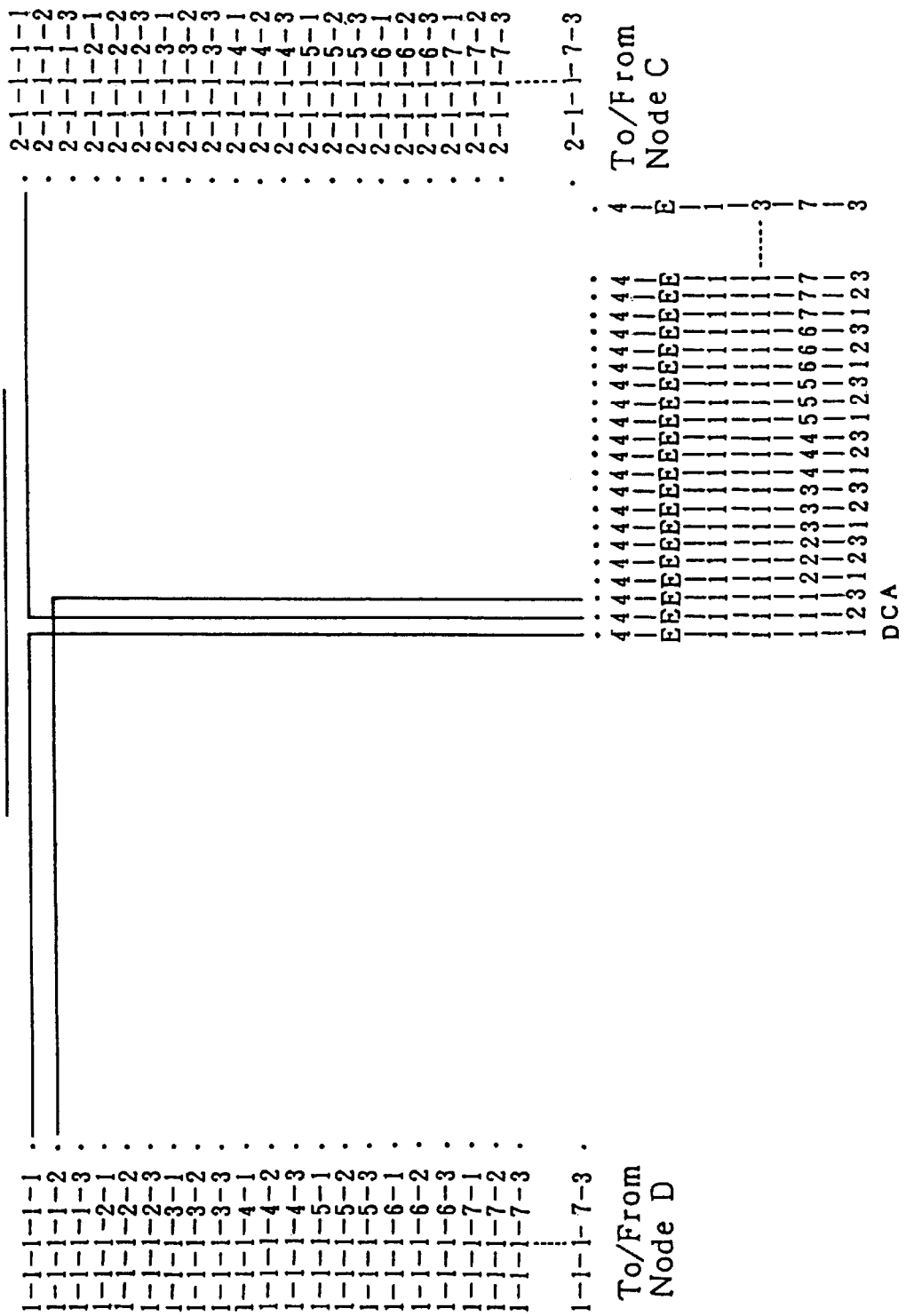
FIG. 11 is a chart showing cross-connection information of the node F.

FIG. 3 illustrates the arrangement of the nodes A, B, C, D, E and F. The thick lines connecting the nodes in FIG. 3 each represent a link provided with multiplex section protection (MSP) and the thin line represents a link with no multiplex section protection. The numerical value next to each link indicates the distance between the corresponding nodes.

The memory 10b of the NMS 10 stores a link inventory showing such link relations. FIG. 5 illustrates link data recorded in the link inventory. Although not shown in FIG. 5, information about: the distances of the respective links is also recorded in the link inventory.

It is here assumed that the operator enters via the input device 10d of the NMS 10 specified information requesting the setting of a path between the nodes A and C, or example, and path selection conditions as shown in FIG. 5, into the main processor 10a. The path selection conditions include a condition that multiplex section protection is available, a condition that the number of relays is the smallest, and a condition that the relay distance is the shortest, the priorities of which are set in the order mentioned.

Figure 4:
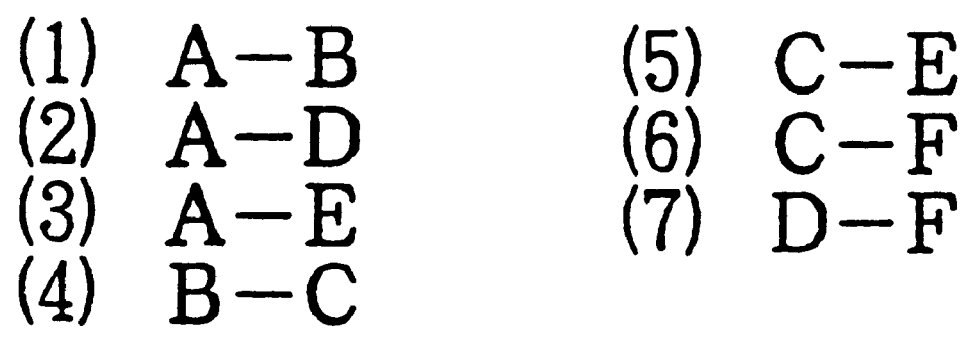

The main processor 10a searches for paths from the node A to the node C by referring to the link inventory stored in the memory 10b. Specifically, the node A as the start point has links connected to the nodes B, D and E, respectively [(1), (2), (3) in FIG. 4]. As for the node B, it has another link connected to the node C [(4) in FIG. 4], in addition to the link connected to the node A [(1) in FIG. 4]. Thus, it is judged that the node A can be connected to the node C via the combination of the links (1) and (4) in FIG. 4. Similarly, for the nodes D and E, it is judged that the node A can be connected to the node C via the combination of the links (2), (7) and (6) in FIG. 4 and also via the combination of the links (3) and (5) in FIG. 4. In this manner, three routes A-B-C, A-E-C, and A-D-F-C are extracted as the paths from the node A to the node C.

After the link-level extraction of connectable paths, it is determined whether a free line exists in the three paths, to thereby perform path-level extraction of connectable routes. The path-level extraction of paths will be explained below.

The memory 10b stores provisioning data including cross-connection information which is line connection information of the individual nodes. FIGS. 6 through 11 illustrate the cross-connection information associated with the respective nodes. In FIG. 6 to 11, the lines connecting port numbers each represent a free line.

While referring to the cross-connection information, the main processor 10a determines whether a free line exists in the three paths identified by the link-level extraction.

Instead of the determination of free lines based on the cross-connection information stored in the memory 10b, the main processor 10a may collect the cross-connection information retained by the individual nodes at the time of path setting, so that free lines can be identified based on the collected cross-connection information. In this case, reference can advantageously be made to the latest cross-connection information.

Further, instead of using the cross-connection information, the main processor 10a may retrieve UNEQ information which is non-line-connection information of the individual nodes contained in alarm/event information stored in the memory 10b, so that free lines may be identified based on the retrieved information.

Also, the main processor 10a may collect the UNEQ information retained by the individual nodes at the time of path setting, so that free lines can be identified based on the collected UNEQ information. In this case, reference can advantageously be made to the latest UNEQ information.

Furthermore, the main processor 10a may retrieve service state information which is line status information of the individual nodes contained in status information stored in the memory 10b, so that free lines can be identified based on the retrieved information.

Also, the main processor 10a may collect the service state information retained by the individual nodes at the time of path setting, so that free lines can be identified based on the collected service state information. In this case, reference can advantageously be made to the latest service state information.

Let it be assumed that the above-described locating of free lines revealed that all of the three paths A–B–C, A–E–C, and A–D–F–C had free lines.

The main processor 10a then selects the optimum one of the three paths in accordance with the path selection conditions (FIG. 5) specified by the operator.

Namely, the main processor 10a determines whether each of the paths fulfills the selection conditions, by referring to the database stored in the memory 10b. More specifically, the main processor 10a checks the number of relays and the transmission distance by referring to the link inventory, and checks the availability of multiplex section protection by referring to the provisioning data. FIG. 12 illustrates the results of such inquiries. In the case of the path A–B–C, for example, both the links A–B and B–C are provided with multiplex section protection (MSP), the number of relays is one, that is, the node B, and the transmission distance is 10 km (=3 km+7 km), as seen from FIG. 3.

Based on the results of the inquiries, the main processor 10a selects the path A–B–C as the optimum path, since multiplex section protection is available and both the number of relays and the transmission distance are the smallest.

Thus, the main processor 10a checks the number of relays, the transmission distance and the availability of multiplex section protection by referring to the link inventory and provisioning data stored in the memory 10b. Alternatively, the main processor 10a may collect routing table information for data communication channels, retained by each node, to check the number of relays.

Also, the main processor 10a may collect setting information retained by each of the nodes, to check the availability of multiplex section protection.

Further, the path selection conditions may include the presence/absence of fault and the fault occurrence rate, in addition to the availability of multiplex section protection, the number of relays, and the transmission distance. Namely, the main processor 10a may check the paths for a fault by referring to the alarm/event information stored in the memory 10b so that a currently faulty path can be excluded from the selections. Also, the main processor 10a may collect fault information retained by the individual nodes to check the paths for a fault based on the collected information so that a currently faulty path can be excluded from the selections. Furthermore, the main processor 10a may check the fault occurrence rates of the individual paths by referring to the alarm/event information and fault history information stored in the memory 10b so that paths with smaller fault occurrence rates may be selected.

After the path A–B–C is selected as the optimum path as mentioned above, the main processor 10a displays the path at the display device 10c for confirmation of its contents by the operator. After the confirmation is made, the main processor 10a carries out cross-connection settings with respect to the nodes A, B and C which are located on the path A–B–C. In the case of the data shown in FIGS. 6 to 11 by way of example, the path is set by way of the ports with the port numbers of the individual nodes A, B and C shown in FIG. 13.

Figure 14:
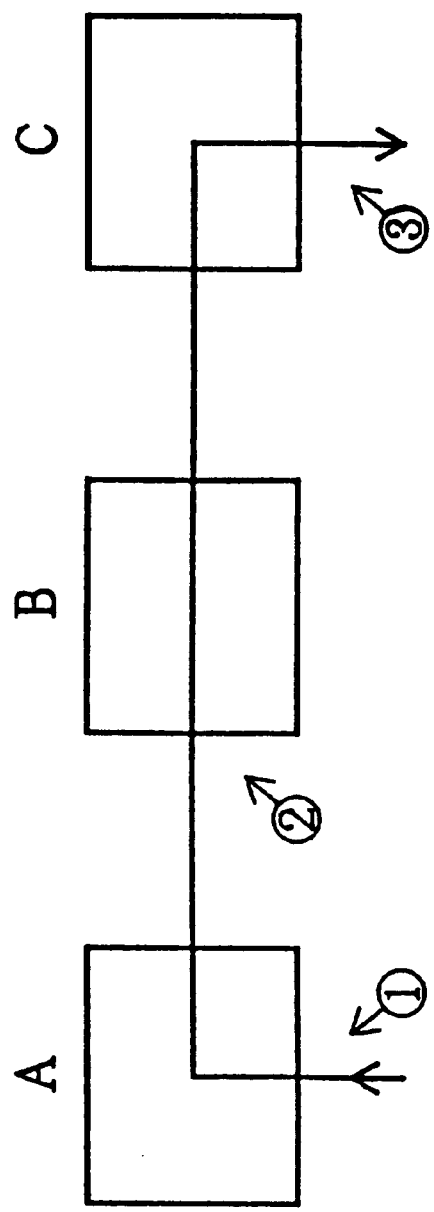
FIG. 14 is a diagram illustrating the path A-B-C.

After carrying out the cross-connection settings, the main processor 10a verifies the path connection state and the line quality. This will be explained with reference to FIG. 14.

First, the main processor 10a sets serial alphanumeric values generated thereby with respect to the odes A, B and C for which the cross-connection settings have been made, as transmission and reception expected values for path trace and through path trace. After transmitting the transmission value from point 1̂ in FIG. 14, the main processor 10a determines whether the value actually received at point 3̂ coincides with the path-trace reception expected value. If the two values coincide, it is judged that the path setting is complete. If, on the other hand, the values do not coincide, then the main processor 10a outputs an alarm and at the same time examines the connection state at point 2̂ by means of the through path trace function to demarcate erroneous setting, followed by path resetting.

After the series of operations described above is completed, the main processor 10a checks the path quality by means of PRBS (PseudoRandom Binary Sequence) function or performance monitor function, and if there is no problem found, the service state of each of the nodes A, B and C is switched to in-service state, thereby starting the service.

As described above, according to the present invention, the NMS refers to the data stored therein or collects data from the individual NEs to automatically extract paths between specified NEs based on the data, then automatically selects a path that fulfills specified path selection conditions, and automatically verifies the path connection or checks the line quality. Accordingly, the operator is relieved of the labor associated with the search for connectable paths, thus making it possible to promptly carry out reliable line settings. Namely, it is possible to cut down the labor costs, shorten the term of work, eliminate human errors, and improve the reliability.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An automatic path setting apparatus for a synchronous communication system equipped with a network management system, comprising:

a plurality of network elements interconnected to form a synchronous network;

a network management system having communication means for communication with each of said network elements;

line connection information storing means, provided in said network management system, for storing information about line connection states of said network elements;

specified information receiving means, provided in said network management system, for receiving specified information about new path settings; and path searching means, provided in said network management system, for searching for a path conforming to the specified information received by said specified information receiving means by referring to the information stored in said line connection information storing means;

wherein said path searching means includes path selecting means which, after paths conforming to the specified information are identified, selects a path having a minimum number of relays by referring to a link inventory retained by said network management system.

2. The automatic path setting apparatus according to claim 1, wherein said line connection information storing means comprises a memory storing provisioning data as a database, and the information about the line connection states is cross-connection information indicating line connections of said network elements.

3. The automatic path setting apparatus according to claim 1, wherein said line connection information storing means comprises a memory storing alarm/event information as a database, and the information about the line connection states is UNEQ information indicating non-line-connections of said network elements.

4. The automatic path setting apparatus according to claim 1, wherein said line connection information storing means comprises a memory storing status information as a database, and the information about the line connection states is service state information indicating line states of said network elements.

5. The automatic path setting apparatus according to claim 1, further comprising:

cross-connection setting means, provided in said network management system, for carrying out cross-connection settings with respect to corresponding network elements located on the path selected by said selecting means; and path connection verifying means, provided in said network management system, for setting serial values generated thereby with respect to the corresponding network elements as path trace data when the cross-connection settings are carried out by said cross-connection setting means, and verifying connection of the path upon completion of the cross-connection settings.

6. The automatic path setting apparatus according to claim 1, further comprising:

cross-connection setting means, provided in said network management system, for carrying out cross-connection settings with respect to corresponding network elements located on the path selected by said selecting means; and path connection verifying means, provided in said network management system, for setting serial values generated thereby with respect to the corresponding network elements as through path trace data when the cross-connection settings are carried out by said cross-connection setting means, and verifying connection of the path upon completion of the cross-connection settings.

7. The automatic path setting apparatus according to claim 6, further comprising resetting means, provided in said network management system, for carrying out cross-connection settings again when the connection of the path fails to be verified by said path connection verifying means.

8. The automatic path setting apparatus according to claim 6, further comprising line quality checking means, provided in said network management system, for checking line quality by means of performance monitor function when the connection of the path is verified by said path connection verifying means.

9. The automatic path setting apparatus according to claim 6, further comprising line quality checking means, provided in said network management system, for checking line quality by means of PRBS (PseudoRandom Binary Sequence) function when the connection of the path is verified by said path connection verifying means.

10. An automatic path setting apparatus for a synchronous communication system equipped with a network management system, comprising:

a plurality of network elements interconnected to form a synchronous network;

a network management system having communication means for communication with each of said network elements;

line connection information collecting means, provided in said network management system for collecting information about line connection states retained by said network elements;

specified information receiving means, provided in said network management system, for receiving specified information about new path settings; and path searching means, provided in said network management system, for searching for a path conforming to the specified information received by said specified information receiving means by referring to the information collected by said line connection information collecting means;

wherein said path searching means includes path selecting means which, after paths conforming to the specified information are identified, selects a path having a minimum number of relays by referring to a link inventory retained by said network management system.

11. The automatic path setting apparatus according to claim 10, wherein the information about the line connection states is cross-connection information indicating line connections of said network elements.

12. The automatic path setting apparatus according to claim 10, wherein the information about the line connection states is UNEQ information indicating non-line-connections of said network elements.

13. The automatic path setting apparatus according to claim 10, wherein the information about the line connection states is service state information indicating line states of said network elements.

14. The automatic path setting apparatus according to claim 5, further comprising:

cross-connection setting means, provided in said network management system, for carrying out cross-connection settings with respect to corresponding network elements located on the path selected by said selecting means; and path connection verifying means, provided in said network management system, for setting serial values generated thereby with respect to the corresponding network elements as path trace data when the cross-connection settings are carried out by said cross-connection setting means, and verifying connection of the path upon completion of the cross-connection settings.

15. The automatic path setting apparatus according to claim 5, further comprising:

cross-connection setting means, provided in said network management system, for carrying out cross-connection settings with respect to corresponding network elements located on the path selected by said selecting means; and path connection verifying means, provided in said network management system, for setting serial values generated thereby with respect to the corresponding network elements as through path trace data when the cross-connection settings are carried out by said cross-connection setting means, and verifying connection of the path upon completion of the cross-connection settings.

16. An automatic path setting apparatus for a synchronous communication system equipped with a network management system, comprising:

a plurality of network elements interconnected to form a synchronous network;

a network management system having communication means for communication with each of said network elements;

line connection information storing means, provided in said network management system, for storing information about line connection states of said network elements;

specified information receiving means, provided in said network management system, for receiving specified information about new path settings; and path searching means, provided in said network management system, for searching for a path conforming to the specified information received by said specified information receiving means by referring to the information stored in said line connection information storing means;

wherein said path searching means includes path selecting means which, after paths conforming to the specified information are identified, collects routing table information for data communication channels retained by said network elements and selects a path having a minimum number of relays.

17. An automatic path setting apparatus for a synchronous communication system equipped with a network management system, comprising:

a plurality of network elements interconnected to form a synchronous network;

a network management system having communication means for communication with each of said network elements;

line connection information storing means, provided in said network management system, for storing information about line connection states of said network elements;

specified information receiving means, provided in said network management system, for receiving specified information about new path settings; and path searching means, provided in said network management system, for searching for a path conforming to the specified information received by said specified information receiving means by referring to the information stored in said line connection information storing means;

wherein said path searching means includes path selecting means which, after paths conforming to the specified information are identified, selects a path having a minimum relay distance by referring to a link inventory retained by said network management system.

18. The automatic path setting apparatus for a synchronous communication system equipped with a network management system, comprising:

a plurality of network elements interconnected to form a synchronous network;

a network management system having communication means for communication with each of said network elements;

line connection information storing means, provided in said network management system, for storing information about line connection states of said network elements;

specified information receiving means, provided in said network management system, for receiving specified information about new path settings; and path searching means, provided in said network management system, for searching for a path conforming to the specified information received by said specified information receiving means by referring to the information stored in said line connection information storing means;

wherein said path searching means includes path selecting means which, after paths conforming to the specified information are identified, selects a path provided with multiplex section protection by referring to provisioning data retained by said network management system.

19. An automatic path setting apparatus for a synchronous communication system equipped with a network management system, comprising:

a plurality of network elements interconnected to form a synchronous network;

a network management system having communication means for communication with each of said network elements;

line connection information storing means, provided in said network management system, for storing information about line connection states of said network elements;

specified information receiving means, provided in said network management system, for receiving specified information about new path settings; and path searching means, provided in said network management system, for searching for a path conforming to the specified information received by said specified information receiving means by referring to the information stored in said line connection information storing means;

wherein said path searching means includes path selecting means which, after paths conforming to the specified information are identified, collects setting information retained by said network elements and selects a path provided with multiplex section protection.

20. An automatic path setting apparatus for a synchronous communication system equipped with a network management system, comprising:

a plurality of network elements interconnected to form a synchronous network;

a network management system having communication means for communication with each of said network elements;

line connection information storing means, provided in said network management system, for storing information about line connection states of said network elements;

specified information receiving means, provided in said network management system, for receiving specified information about new path settings; and path searching means, provided in said network management system, for searching for a path conforming to the specified information received by said specified information receiving means by referring to the information stored in said line connection information storing means;

wherein said path searching means includes path selecting means which, after paths conforming to the specified information are identified, selects a presently fault-free path by referring to alarm/event information retained by said network management system.

21. An automatic path setting apparatus for a synchronous communication system equipped with a network management system, comprising:

a plurality of network elements interconnected to form a synchronous network;

a network management system having communication means for communication with each of said network elements;

line connection information storing means, provided in said network management system, for storing information about line connection states of said network elements;

specified information receiving means, provided in said network management system, for receiving specified information about new path settings; and path searching means, provided in said network management system, for searching for a path conforming to the specified information received by said specified information receiving means by referring to the information stored in said line connection information storing means;

wherein said path searching means includes path selecting means which, after paths conforming to the specified information are identified, collects fault information retained by said network elements and selects a presently fault-free path.

22. An automatic path setting apparatus for a synchronous communication system equipped with a network management system, comprising:

a plurality of network elements interconnected to form a synchronous network;

a network management system having communication means for communication with each of said network elements;

line connection information storing means, provided in said network management system, for storing information about line connection states of said network elements;

specified information receiving means, provided in said network management system, for receiving specified information about new path settings; and path searching means, provided in said network management system, for searching for a path conforming to the specified information received by said specified information receiving means by referring to the information stored in said line connection information storing means;

wherein said path searching means includes path selecting means which, after paths conforming to the specified information are identified, selects a path with a low fault occurrence rate by referring to alarm/event information and fault history information retained by said network management system.

23. An automatic path setting apparatus for a synchronous communication system equipped with a network management system, comprising:

a plurality of network elements interconnected to form a synchronous network;

a network management system having communication means for communication with each of said network elements;

line connection information collecting means, provided in said network management system for collecting information about line connection states retained by said network elements;

specified information receiving means, provided in said network management system, for receiving specified information about new path settings; and path searching means, provided in said network management system, for searching for a path conforming to the specified information received by said specified information receiving means by referring to the information collected by said line connection information collecting means;

wherein said path searching means includes path selecting means which, after paths conforming to the specified information are identified, collects routing table information for data communication channels retained by said network elements and selects a path having a minimum number of relays.

24. An automatic path setting apparatus for a synchronous communication system equipped with a network management system, comprising:

a plurality of network elements interconnected to form a synchronous network;

a network management system having communication means for communication with each of said network elements;

line connection information collecting means, provided in said network management system for collecting information about line connection states retained by said network elements;

specified information receiving means, provided in said network management system, for receiving specified information about new path settings; and path searching means, provided in said network management system, for searching for a path conforming to the specified information received by said specified information receiving means by referring to the information collected by said line connection information collecting means;

wherein said path searching means includes path selecting means which, after paths conforming to the specified information are identified, selects a path having a minimum relay distance by referring to link inventory retained by said network management system.

25. An automatic path setting apparatus for a synchronous communication system equipped with a network management system, comprising:

a plurality of network elements interconnected to form a synchronous network;

a network management system having communication means for communication with each of said network elements;

line connection information collecting means, provided in said network management system for collecting information about line connection states retained by said network elements;

specified information receiving means, provided in said network management system, for receiving specified information about new path settings; and path searching means, provided in said network management system, for searching for a path conforming to the specified information received by said specified information receiving means by referring to the information collected by said line connection information collecting means;

wherein said path searching means includes path selecting means which, after paths conforming to the specified information are identified, selects a path provided with multiplex section protection by referring to provisioning data retained by said network management system.

26. An automatic path setting apparatus for a synchronous communication system equipped with a network management system, comprising:

a plurality of network elements interconnected to form a synchronous network;

a network management system having communication means for communication with each of said network elements;

line connection information collecting means, provided in said network management system for collecting information about line connection states retained by said network elements;

specified information receiving means, provided in said network management system, for receiving specified information about new path settings; and path searching means, provided in said network management system, for searching for a path conforming to the specified information received by said specified information receiving means by referring to the information collected by said line connection information collecting means;

wherein said path searching means includes path selecting means which, after paths conforming to the specified information are identified, collect setting information retained by said network elements and selects a path provided with multiplex section protection.

27. An automatic path setting apparatus for a synchronous communication system equipped with a network management system, comprising:

a plurality of network elements interconnected to form a synchronous network;

a network management system having communication means for communication with each of said network elements;

line connection information collecting means, provided in said network management system for collecting information about line connection states retained by said network elements;

specified information receiving means, provided in said network management system, for receiving specified information about new path settings; and path searching means, provided in said network management system, for searching for a path conforming to the specified information received by said specified information receiving means by referring to the information collected by said line connection information collecting means;

wherein said path searching means includes path selecting means which, after paths conforming to the specified information are identified, selects a presently fault-free path by referring to alarm/event information retained by said network management system.

28. An automatic path setting apparatus for a synchronous communication system equipped with a network management system, comprising:

a plurality of network elements interconnected to form a synchronous network;

a network management system having communication means for communication with each of said network elements;

line connection information collecting means, provided in said network management system for collecting information about line connection states retained by said network elements;

specified information receiving means, provided in said network management system, for receiving specified information about new path settings; and path searching means, provided in said network management system, for searching for a path conforming to the specified information received by said specified information receiving means by referring to the information collected by said line connection information collecting means;

wherein said path searching means includes path selecting means which, after paths conforming to the specified information are identified, collects fault information retained by said network elements and selects a presently fault-free path.

29. An automatic path setting apparatus for a synchronous communication system equipped with a network management system, comprising:

a plurality of network elements interconnected to form a synchronous network;

a network management system having communication means for communication with each of said network elements;

line connection information collecting means, provided in said network management system for collecting information about line connection states retained by said network elements;

specified information receiving means, provided in said network management system, for receiving specified information about new path settings; and path searching means, provided in said network management system, for searching for a path conforming to the specified information received by said specified information receiving means by referring to the information collected by said line connection information collecting means;

wherein said path searching means includes path selecting means which, after paths conforming to the specified information are identified, selects a path with a low fault occurrence rate by referring to alarm/event information and fault history information retained by said network management system.

* * * * *